(12) United States Patent
Pan

(10) Patent No.: US 9,005,412 B2
(45) Date of Patent: Apr. 14, 2015

(54) ELECTROLYZER

(71) Applicant: Wen-Fu Pan, Taipei (TW)

(72) Inventor: Wen-Fu Pan, Taipei (TW)

(73) Assignee: Hydro Genes Trans Inc., Taoyuan (TW)

( * ) Notice: Subject to any disclaimer, the term of this patent is extended or adjusted under 35 U.S.C. 154(b) by 0 days.

(21) Appl. No.: 13/959,547

(22) Filed: Aug. 5, 2013

(65) Prior Publication Data

US 2015/0034479 A1 Feb. 5, 2015

(51) Int. Cl.
| | |
|---|---|
| C25B 11/03 | (2006.01) |
| C25B 9/12 | (2006.01) |
| C25B 1/04 | (2006.01) |
| C25C 7/00 | (2006.01) |
| C25C 7/02 | (2006.01) |
| C25B 9/04 | (2006.01) |
| C25B 1/06 | (2006.01) |

(52) U.S. Cl.
CPC .... *C25B 9/04* (2013.01); *C25B 1/06* (2013.01)

(58) Field of Classification Search
CPC .............. C25C 7/00; C25C 7/02; C25B 9/00; C25B 9/12
USPC .................................. 204/280, 242, 193, 194
See application file for complete search history.

(56) References Cited

U.S. PATENT DOCUMENTS

| | | | |
|---|---|---|---|
| 3,394,062 A | 7/1968 | Rhodes | |
| 4,046,119 A | 9/1977 | Perry | |
| 4,049,531 A | 9/1977 | Ban | |
| 4,141,323 A | 2/1979 | Hart | |
| 4,369,102 A | 1/1983 | Galluzzo et al. | |
| 4,800,011 A * | 1/1989 | Abbott et al. | 204/665 |
| 5,556,522 A | 9/1996 | Ingalls et al. | |
| 5,744,939 A * | 4/1998 | Leppo | 320/153 |

(Continued)

FOREIGN PATENT DOCUMENTS

GB 2449724 A 12/2008

OTHER PUBLICATIONS

Wendt H. and Kreysa G., Chapter 4, Electrode Kinetics and Electrocatalysis, Electrochemical Engineering, Springer-Verlag, Berlin, 1999, pp. 39-80.

(Continued)

*Primary Examiner* — Zulmariam Mendez
(74) *Attorney, Agent, or Firm* — Blakely, Sokoloff, Taylor & Zafman LLP

(57) ABSTRACT

An exemplary electrolyzer includes an electrode plate assembly including a plurality of perforated electrode plates and electrically conductive busbars. The plurality of electrode plates includes one or more positive electrode plates interleaved with one or more negative electrode plates. Each electrode plate has a first aperture and a second aperture, the second aperture being larger than the first aperture and lined with a non-conductive grommet. The plurality of electrically conductive busbars includes a first positive conductive busbar and a first negative conductive busbar. Respective conductive busbars extend through the first aperture of corresponding positive and negative electrodes and through the non-conductive grommet of the second aperture of each corresponding negative and positive electrode. The first positive conductive busbar is in electrical contact with each positive electrode and insulated from each negative electrode, and the first negative conductive busbar is in electrical contact with each negative electrode and insulated from each positive electrode.

44 Claims, 13 Drawing Sheets

(56) References Cited

U.S. PATENT DOCUMENTS

| | | | |
|---|---|---|---|
| 6,257,175 | B1 | 7/2001 | Mosher et al. |
| 8,282,812 | B2 | 10/2012 | Burtch |
| 8,303,798 | B2 | 11/2012 | Dees et al. |
| 8,308,919 | B2 | 11/2012 | Fletcher |
| 2007/0074680 | A1 | 4/2007 | Ross |
| 2007/0181443 | A1* | 8/2007 | Basol et al. .......... 205/650 |
| 2009/0035638 | A1 | 2/2009 | Tsai et al. |
| 2009/0255826 | A1 | 10/2009 | McWhinney et al. |
| 2012/0067021 | A1 | 3/2012 | Aggelopoulos |
| 2012/0234265 | A1 | 9/2012 | Ball |
| 2012/0298521 | A1 | 11/2012 | Richardson |
| 2013/0270116 | A1* | 10/2013 | Hu et al. .......... 204/661 |
| 2014/0174915 | A1* | 6/2014 | Trott .......... 204/230.6 |

OTHER PUBLICATIONS

Wendt H. and Kreysa G., Chapter 7, Electrochemical Engineering of Porous Electrodes and Disperse Multiphase Electrolyte Systems, Electrochemical Engineering, Springer-Verlag, Berlin, 1999, pp. 153-186.

Wendt H. and Kreysa G., Chapter 8, Electrochemical Cell and Plant Engineering, Electrochemical Engineering, Springer-Verlag, Berlin, 1999, pp. 187-220.

Wendt H. and Kreysa G., Chapter 10, Industrial Electrodes, Electrochemical Engineering, Springer-Verlag, Berlin, 1999, pp. 252-289.

Wendt H. and Kreysa G., Chapter 11, Industrial Processes, Electrochemical Engineering, Springer-Verlag, Berlin, 1999, pp. 290-369.

PCT International Search Report and Written Opinion for PCT/IB2013/001901, mailed Apr. 29, 2014, 8 pages.

* cited by examiner

ELECTROLYZER

FIELD OF THE INVENTION

The various embodiments described herein relate to an electrolysis device. In particular, embodiments relate to an electrolyzer with an electrode plate assembly that dissociates water into hydrogen and oxygen gases using low voltage and high amperage direct current.

BACKGROUND OF THE INVENTION

Electrolysis dissociates water into hydrogen and oxygen gases by passing an electric current through the water. For example, a power source is connected to two or more electrode plates submerged in an electrolyte-water solution. As current passes between the electrodes, hydrogen gas forms at the negative electrode(s), and oxygen gas forms at the positive electrode(s).

Electrode plates of a common polarity are often connected to conductive busbars via connector tabs at the topside of each electrode plate. Positive and negative tabs may be found on opposite left and right portions of the topside of respective positive and negative plates to prevent a conductive busbar of one polarity from coming into physical contact with electrode plates of the opposite polarity. This tabbed connection, due to ohmic voltage drops in the electrode, results in uneven potential and current density distribution on the electrode plate surface.

SUMMARY OF THE INVENTION

An exemplary electrolyzer includes an electrode plate assembly including a plurality of electrode plates and a plurality of electrically conductive busbars. One or more of the plurality of electrode plates have perforations distributed across a surface of the electrode plate. The plurality of electrode plates includes one or more positive electrode plates interleaved with one or more negative electrode plates. Each electrode plate has a first aperture and a second aperture, the second aperture being larger than the first aperture and lined with a non-conductive grommet. The plurality of electrically conductive busbars includes a first positive conductive busbar and a first negative conductive busbar. The first positive conductive busbar extends through the first aperture of each positive electrode plate and through the non-conductive grommet of the second aperture of each negative electrode plate. As a result, the first positive conductive busbar is in electrical contact with each positive electrode plate and insulated from each negative electrode plate. The first negative conductive busbar extends through the first aperture of each negative electrode plate and through the non-conductive grommet of the second aperture of each positive electrode plate. As a result, the first negative conductive busbar is in electrical contact with each negative electrode plate and insulated from each positive electrode plate.

In one embodiment, the perforated electrode plates include a first margin without perforations extending lengthwise along a central axis of the electrode plate and having a width greater than or equal to a diameter of the second aperture. The first aperture and the second aperture are located within the first margin. The perforated electrode plates may further include a second margin without perforations, the second margin running along a perimeter of the electrode plate and having a width greater than or equal to two millimeters.

In another embodiment, the electrolyzer includes a second positive conductive busbar and a second negative conductive busbar. Each electrode plate has a third aperture and a fourth aperture, the fourth aperture being larger than the third aperture and lined with a non-conductive grommet. The second positive conductive busbar extends through the third aperture of each positive electrode plate and through the non-conductive grommet of the fourth aperture of each negative electrode plate. As a result, the second positive conductive busbar is in electrical contact with each positive electrode plate and insulated from each negative electrode plate. The second negative conductive busbar extends through the third aperture of each negative electrode plate and through the non-conductive grommet of the fourth aperture of each positive electrode plate. As a result, the second negative conductive busbar is in electrical contact with each negative electrode plate and insulated from each positive electrode plate.

In an embodiment with two positive conductive busbars and two negative conductive busbars, the perforated electrode plates include a first margin without perforations, the first margin running along a perimeter of the perforated electrode plate and having a width greater than or equal to two millimeters. The perforated electrode plates may be substantially rectangular and include the first and third apertures in diagonally opposed corners. Additionally, the one or more perforated electrode plates may include a second margin without perforations having a width greater than or equal to a diameter of the first aperture and that extends diagonally from the first aperture to the third aperture.

Other features and advantages will be apparent from the accompanying drawings and from the detailed description.

BRIEF DESCRIPTION OF THE DRAWINGS

The present invention is illustrated by way of example and not limitation in the figures, in which like references indicate similar elements, and in which.

DETAILED DESCRIPTION

The electrode plates described herein have apertures and electrically conductive busbars that extend through the apertures. As a result of the placement of the apertures, and resulting electrical connections to the conductive busbars, the described embodiments minimize the distance that current travels to/from any point on the surface of the electrode plate. These shorter distances correlate to less ohmic voltage drops and more evenly distributed current densities than, e.g., electrode plates with tabbed connections.

The electrode plates are perforated to maximize hydrogen and oxygen gas production. The perforations generate currents of the electrolyte solution away from the electrode plates during electrolysis, helping equalize the ion concentrations among anodes and cathodes and sweeping away bubbles that form on the electrode plates. Given that the perforations increase the resistance to the electrical current flow on the electrode plates, embodiments described herein include non-perforated margins. These margins provide low-resistance pathways for the current to travel across the electrode plates, helping to maintain an even current density distribution.

Additionally, embodiments described herein produce hydrogen gas and oxygen gas at a low temperature. For example, in electrolysis employing a voltage greater than 6 volts, a portion of the electrical energy used for the electrolysis also heats the electrolyte solution. Heating the electrolyte solution creates water vapor and electrolyte mist. In contrast, embodiments described herein limit the input voltage of the electrolysis assembly. As a result, the amount of water vapor and electrolyte mist in the generated gas mixture is reduced and the hydrogen gas produced is of greater purity. While the embodiments are operated at a low voltage, the higher amperage direct current used corresponds to a higher production of hydrogen and oxygen gases.

Embodiments described herein include a multipurpose bubbler. The bubbler is used to eliminate electrolyte mist from the generated gases. The bubbler also serves as a water reservoir and generates water vapor. While it is undesirable to waste electrical energy in heating the electrolyte solution, the introduction of water vapor into an air fuel mixture, e.g., of an internal combustion engine, has advantages including reduced air pollution, increased engine efficiency/decreased fuel consumption, reduced combustion temperature of the engine, and reduced accumulation of carbon deposits in the engine.

Additional features and advantages are described with reference to FIGS. 1-12.

Figure 1:
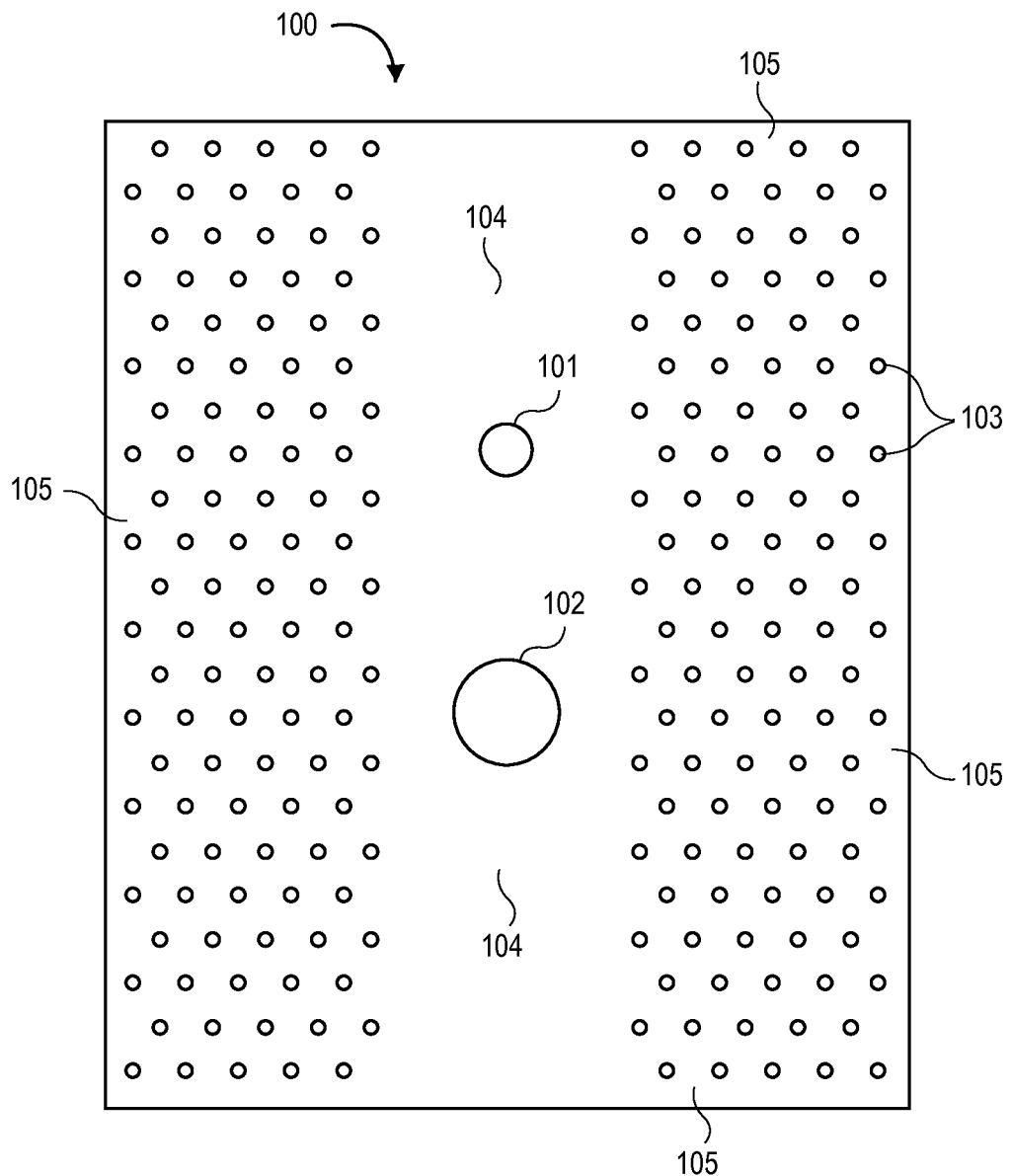
FIG. 1 is a planar view of an electrode plate according to a first embodiment.
Figure 2:
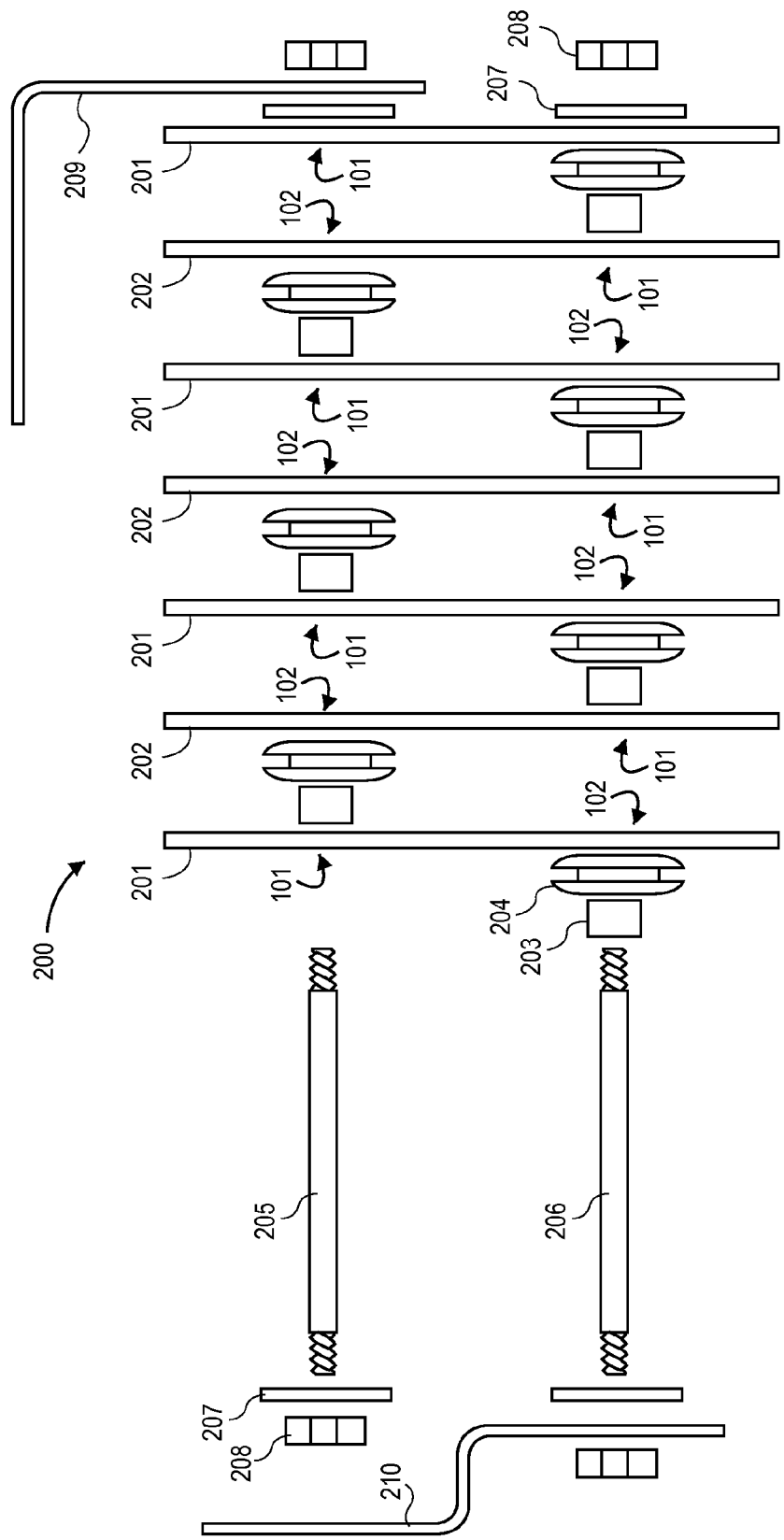
FIG. 2 is an exploded side view of the electrode plate assembly using electrode plates according to the first embodiment.

FIG. 1 is a planar view of electrode plate 100. In one embodiment, electrode plate 100 is rectangular in shape (as shown in the planar view), approximately 4 inches in height, 3 inches in width, and between 0.5 millimeters (mm) and 2 mm in thickness (thickness is not shown in FIG. 1, but is shown in FIG. 2). In an alternate embodiment, electrode plate 100 is substantially rectangular in shape (e.g., with corner angles between 80-110 degrees) or another shape or size.

Conductive components described herein, including electrode plate 100, are comprised of one or more of platinum, palladium, rhodium, titanium, or nickel, or alloys or intermetallic mixtures of platinum, titanium, steel (including 316L or 316H stainless steel), or another material that provides electrical conductivity, corrosion resistance, and contributes to the efficiency of the electrolysis. In one embodiment, one or more conductive components, such as electrode plate 100, are coated with an electrochemically active material such as a platinum group metal, a metal oxide, or a mixture thereof.

Electrode plate 100 includes two apertures, aperture 101 and aperture 102, along a central axis that traverses electrode plate 100. Aperture 101 is smaller than aperture 102. In one embodiment, the diameter of aperture 101 is approximately 6 mm and the diameter of aperture 102 is approximately 16 mm. As will be described in more detail below, a conductive busbar passes through aperture 101 and makes an electrical connection with electrode plate 100. In one embodiment, the diameter of aperture 101 corresponds to the diameter of the busbar to facilitate the electrical connection between the conductive busbar and the interior surface of electrode plate 100 that defines the perimeter of aperture 101. Additionally, a conductive busbar passes through a non-conductive grommet or other non-conductive lining within aperture 102. In one embodiment, the diameter of aperture 102 corresponds to the diameter of the conductive busbar combined with a minimum thickness of a non-conductive grommet to facilitate the conductive busbar passing through aperture 102 without making an electrical connection.

Perforations 103 are distributed across the surface of electrode plate 100. Perforations 103 allow the electrolyte solution to flow through the electrode plate (e.g., from a side including the illustrated planar surface to the side of the opposite planar surface). Furthermore, perforations 103 generate currents of electrolyte fluid away from the surfaces of electrode plate 100 during electrolysis, increasing circulation of the electrolyte solution, sweeping away bubbles that form on the electrode plates, promoting ionic migration, and equalizing the ion concentration between anodes and cathodes. In one embodiment, perforations 103 are circular and have a diameter between 0.8 mm to 2 mm.

Central margin 104 extends along the central axis of the electrode plate 100. The width of central margin 104 is greater than or equal to the diameter of aperture 102. In one embodiment, central margin is 4-6 mm wider than the diameter of aperture 102. For example, if aperture 102 has a diameter of 16 mm, central margin 104 is 20-22 mm wide. The location of aperture 101, near the center of electrode plate 100, promotes an even current density distribution across electrode plate 100 by minimizing the distance the electric current flows between the portion of electrode plate 100 that makes physical and electrical connection with a conductive busbar passing through aperture 101 and the other portions of electrode plate 100. The location of aperture 101 within central margin 104 provides lower resistance paths (e.g., as compared to perforated portions of electrode plate 100), further promoting an even current density at the portions of electrode plate 100 that are furthest away from aperture 101.

In one embodiment, border margin 105 extends along the perimeter of electrode plate 100. Similar to margin 104, border margin 105 provides lower resistance paths to promote an even current density at the portions of electrode plate 100 that are furthest away from aperture 101. In one embodiment, border margin 105 is between 2-3 mm in width from each edge of electrode plate 100.

In one embodiment, the locations of apertures 101 and 102 in electrode plate 100 enable electrode plate to be used for both positive and negative electrode plates. Electrode plates 100 of opposite polarity are rotated 180 degrees in orientation (e.g., around the center of the illustrated planar view) such that aperture 101 of a positive electrode plate aligns with aperture 102 of a negative electrode plate, and vice versa. As a result, a positive conductive busbar would make an electrical connection with the positive plate at the corresponding aperture 101 and be insulated from the negative plate by the non-conductive grommet within the corresponding aperture 102. The negative conductive busbar would be insulated from the positive plate by the non-conductive grommet within the corresponding aperture 102 and make an electrical connection with the negative plate at the corresponding aperture 101. In alternative embodiments, the positive plates and negative plates (as compared to one another) may be different sizes or shapes, be made of different materials, have different amounts of perforations (e.g., one plate may have no perforations), have perforations of different sizes or in different locations, etc. In one embodiment, electrode plates 100 have multiple apertures 101 and multiple apertures 102.

FIG. 2 is an exploded side view of electrode plate assembly 200 using multiple electrode plates 100. As described above, electrode plates 100 of opposite polarity are rotated 180 degrees in orientation. For example, negative plates 201 are electrode plates 100 oriented with aperture 101 above aperture 102, and positive plates 202 are electrode plates 100 oriented with aperture 102 above aperture 101. Alternatively, negative plates 201 and positive plates 202 may be rotated to another orientation such that the apertures 101 and 102 are side-by-side, such that negative plates 201 are oriented with aperture 102 to the right or left of aperture 101, etc.

Negative plates 201 are interleaved with positive plates 202. As illustrated, each negative plate 201 is adjacent to at least one positive plate 202. In one embodiment, there are an odd number of electrode plates 100, with one more negative plate 201 than the number of positive plates 202. For example, electrode plate assembly 200 includes seven electrode plates 100, including four negative plates 201 and three positive plates 202. More or less electrode plates 100 may be included. In one embodiment, nineteen positive plates 202 are interleaved between twenty negative plates 201.

Each electrode plate 100 includes a non-conducting grommet 204 (e.g., made of rubber, a plastic such as polypropylene, or another non-conductive, corrosion-resistant material) inserted in aperture 102. In the exploded view, grommet 204 is illustrated to the left of the corresponding electrode plate 100 into which grommet 204 is inserted. Grommet 204 lines the interior edge of aperture 102 and extends radially into opposing planar surfaces of electrode plate 100. In one embodiment, the width of each grommet 204 (in the horizontal direction illustrated in the exploded view) enables grommets 204 to maintain spacing between adjacent electrode plates 100.

A hollow conductive sleeve 203 is included within a through-hole of grommet 204. In one embodiment, conductive sleeve 203 is cylindrical and the inner radius of grommet 204 is greater than or equal to the outer radius of conductive sleeve 203 and the inner radius of the conductive sleeve 203 is greater than or equal to the radius of aperture 101 or conductive busbar 205/206. The width of conductive sleeve 203 (in the horizontal direction illustrated in the exploded view) is greater than or equal to the width of grommet 204. As a result, conductive sleeves 203 may help maintain spacing between adjacent electrode plates 100. In one embodiment, the width of conductive sleeve 203 is equal to the combined thickness of electrode plate 100 and twice the spacing between electrode plates 100 (e.g., between 2-6 mm).

Negative conductive busbar 205 passes through aperture 101 of each of the negative plates 201 and conductive sleeve 203, grommet 204, and aperture 102 of each of the positive plates 202. Positive conductive busbar 206 passes through aperture 101 of each of the positive plates 202 and conductive sleeve 203, grommet 204, and aperture 102 of each of the negative plates 201. In one embodiment, conductive sleeves 203 are made of an electrically conductive material and are in electrical contact with a corresponding conductive busbar 205/206 and electrode plates 100 of the same polarity. For example, negative conductive busbar 205 passes through the upper three conductive sleeves 203, making an electrical connection between negative conductive busbar 205 and each of the upper three conductive sleeves 203. The upper three conductive sleeves 203, being greater than or equal in width to the upper three grommets 204, are held in contact with a negative plate 201 on one or both sides of each respective conductive sleeve 203. As a result, the upper three conductive sleeves 203 increase the surface area of electrical connection between each negative plate 201 and negative conductive busbar 205. Additionally, conductive sleeves 203 make an electrical connection between negative plates 201. The lower three conductive sleeves 203 make similar electrical connections between positive conductive busbar 206 and positive electrode plates 202.

Conductive washers 207 and conductive nuts 208 are secured to either end of conductive busbars 205 and 206. Negative conductive bracket 209 is secured by a conductive nut 208 and includes an aperture (not shown) through which negative conductive busbar 205 passes and makes an electrical connection with negative conductive bracket 209. As a result, negative conductive bracket 209 is both mechanically and electrically connected to negative conductive busbar 205. Positive conductive bracket 210 is secured by a conductive nut 208 and includes an aperture (not shown) through which positive conductive busbar 206 passes and makes an electrical connection with positive conductive bracket 210. As a result, positive conductive bracket 210 is both mechanically and electrically connected to positive conductive busbar 206. In one embodiment, conductive brackets 209 and 210 are secured at opposite ends of electrode plate assembly 200.

Figure 3:
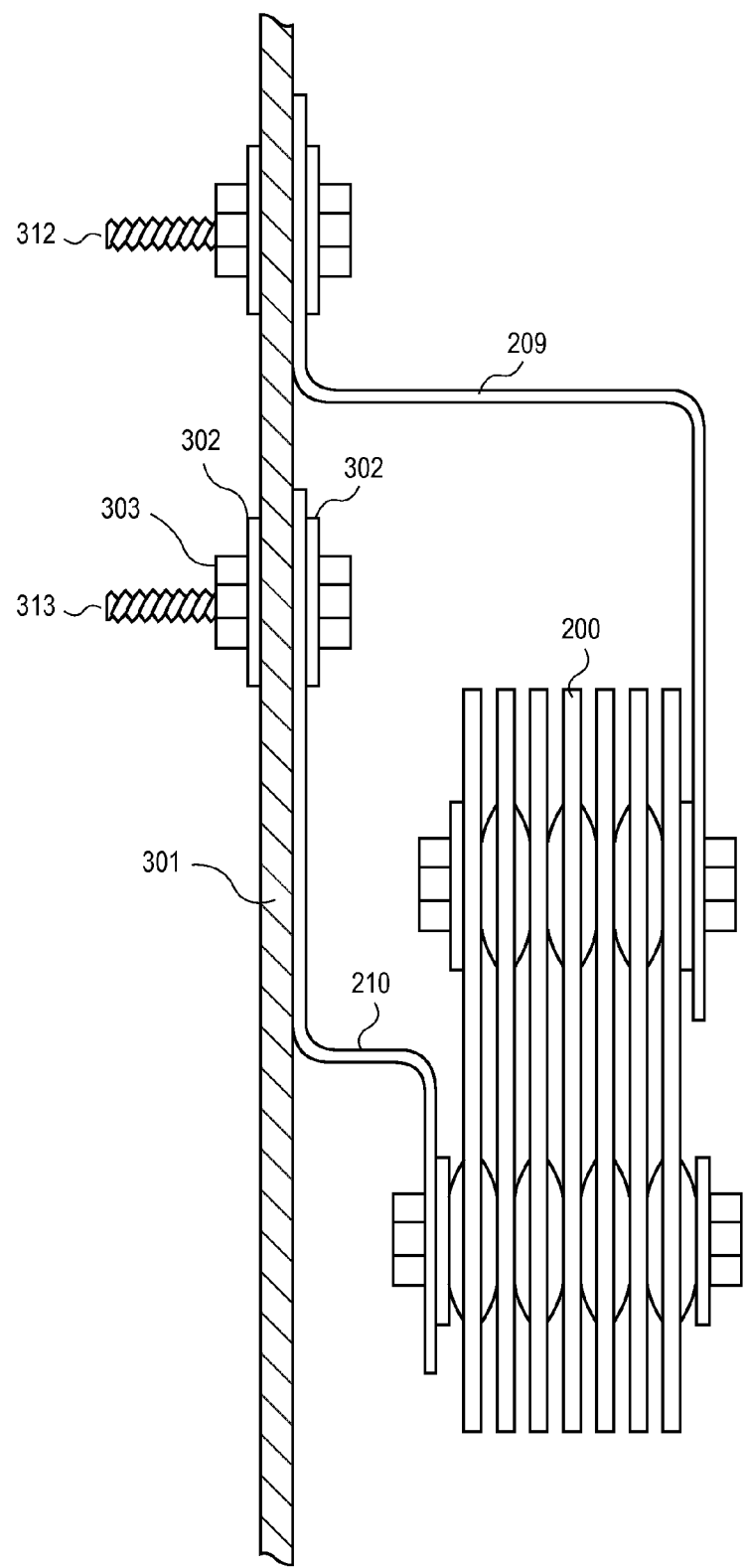
FIG. 3 is a side view of the assembled electrode plate assembly using electrode plates according to the first embodiment.

FIG. 3 is a side view of the assembled electrode plate assembly 200 using electrode plates 100. In an embodiment including conductive sleeves 203 of equal width to grommets 204, conductive sleeves 203 are placed within grommets 204 and therefore not visible when assembled (e.g., as illustrated in FIG. 3). With conductive nuts 208 secured to either end of conductive busbars 205 and 206, the electrode plates 100 are brought into close proximity with one another. Grommets 204 and/or conductive sleeves 203 maintain the spacing between electrode plates 100, e.g., keeping them approximately parallel to one another. In one embodiment, electrode plates 100 are spaced between 0.8 mm to 2 mm apart.

Conductive brackets 209 and 210 fasten electrode assembly 200 to wall 301 of the electrolysis housing container. For example, conductive brackets 209 and 210 each include an aperture (not shown) through which conductive bolts 312 and 313 pass and are mechanically secured by washers 302 and nuts 303. Conductive bolts 312 and 313, by way of respective electrical connections to conductive brackets 209 and 210, serve as electrodes on an external portion of wall 301 or another portion of the housing container. As a result, when the electrolysis housing container is filled with an electrolyte solution, a voltage may be applied across conductive bolts 312 and 313, leading to a voltage across (and corresponding current between) electrode plates 100. The electrolysis housing container will be described in additional detail with reference to FIGS. 8 and 9.

Figure 4:
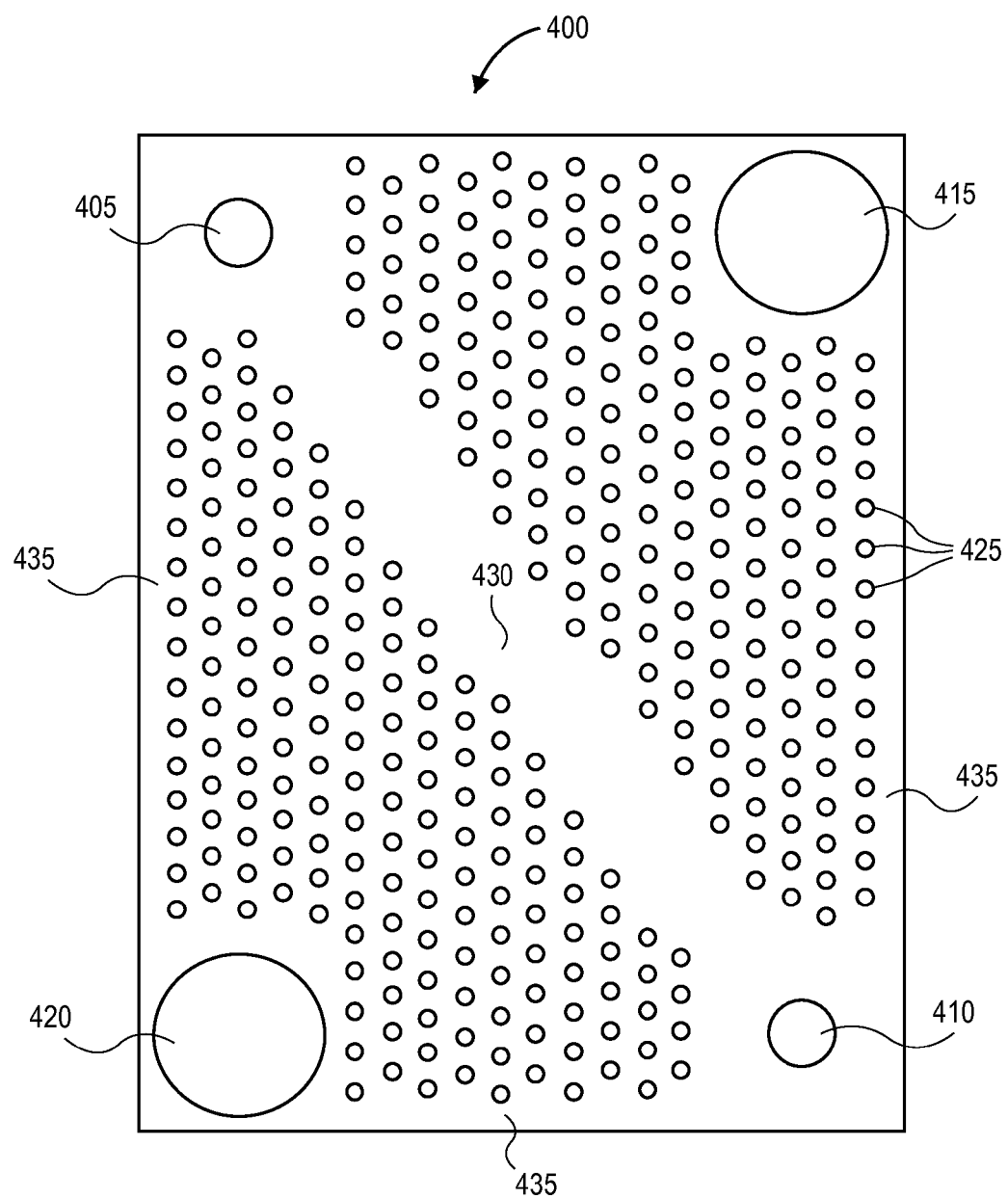
FIG. 4 is a planar view of an electrode plate according to a second embodiment.
Figure 5:
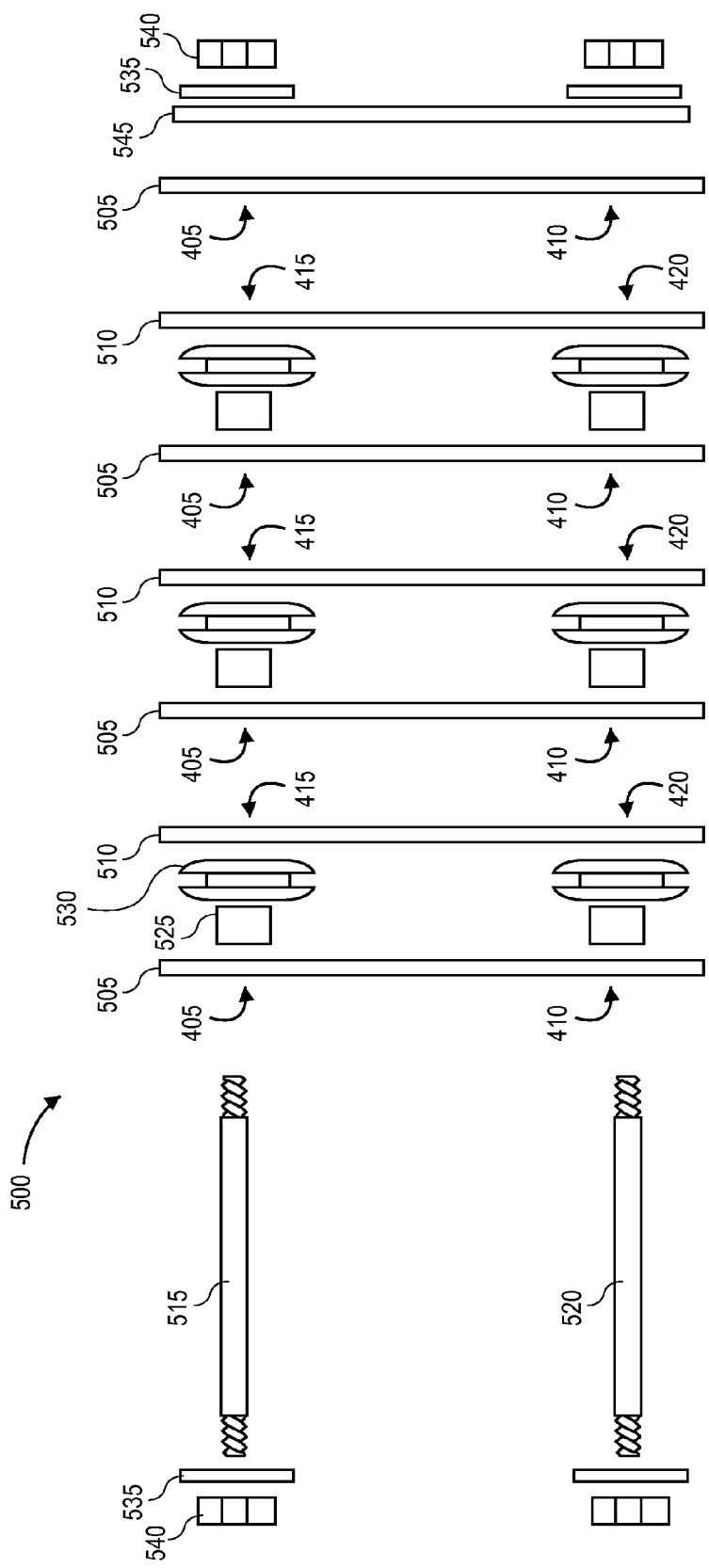
FIG. 5 is an exploded side view of the electrode plate assembly using electrode plates according to the second embodiment.
Figure 6:
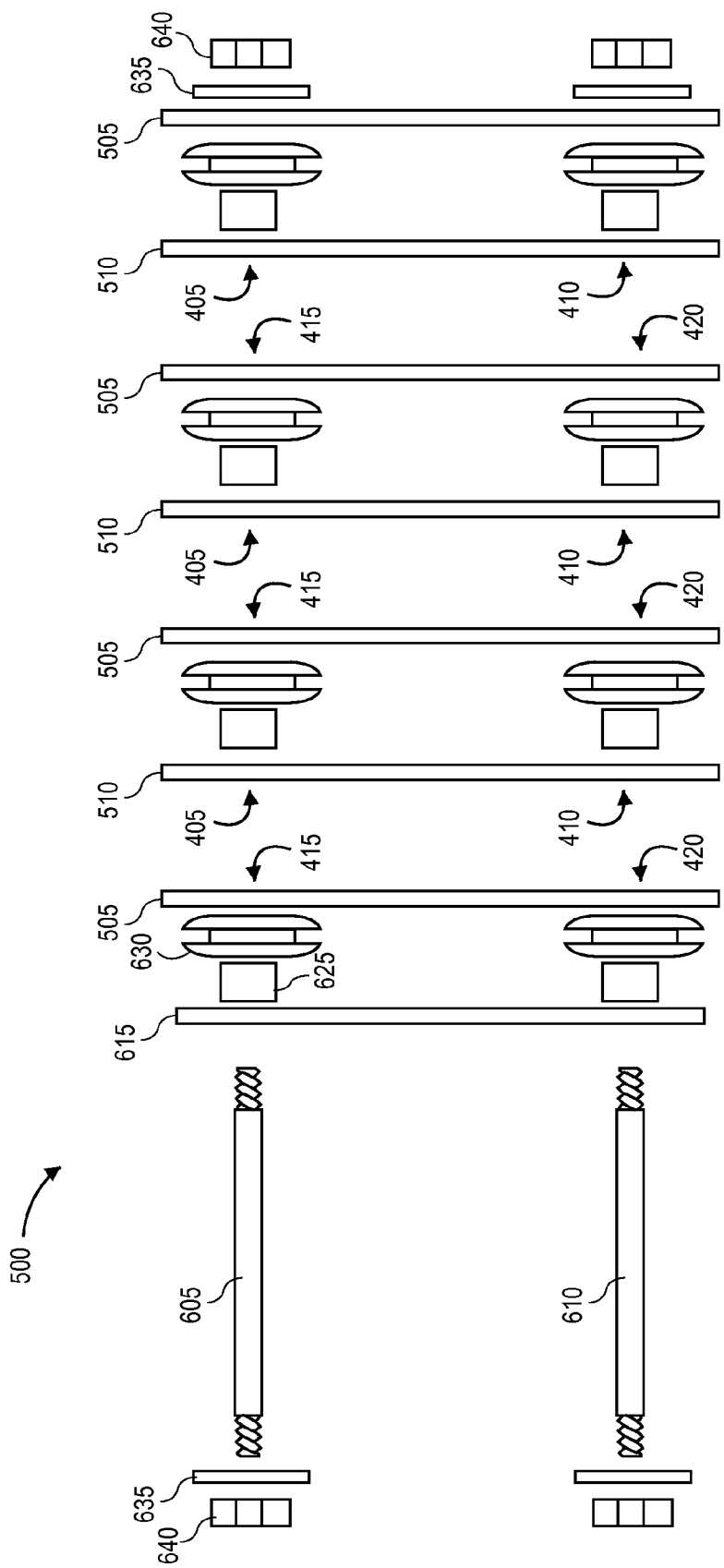
FIG. 6 is another exploded side view of the electrode plate assembly using electrode plates according to the second embodiment.

FIG. 4 is a planar view of electrode plate 400. Similar to electrode plate 100, an embodiment of electrode plate 400 is rectangular in shape (as shown in the planar view), approximately 4 inches in height, 3 inches in width, and between 0.5 mm and 2 mm in thickness (thickness is not shown in FIG. 4, but is shown in FIGS. 5-6). In an alternate embodiment, electrode plate 400 is substantially rectangular in shape (e.g., with corner angles between 80-110 degrees) or another shape.

As described above, electrode plate 400 is comprised of one or more of platinum, palladium, rhodium, titanium, or nickel, or alloys or intermetallic mixtures of platinum, titanium, steel (including 316L or 316H stainless steel), or another material that provides electrical conductivity, corrosion resistance, and contributes to the efficiency of the electrolysis. In one embodiment, electrode plate 400 is coated with an electrochemically active material such as a platinum group metal, a metal oxide, or a mixture thereof.

Electrode plate 400 includes four apertures 405-420. In one embodiment, an aperture 405/410/415/420 is located in each respective corner of electrode plate 400, with apertures of similar diameters in diagonally opposite corners. Apertures 405 and 410 are smaller than apertures 415 and 420. In one embodiment, the diameter of apertures 405 and 410 is approximately 6 mm and the diameter of apertures 415 and 420 is approximately 16 mm. As will be described in more detail below, conductive busbars pass through apertures 405 and 410 and make an electrical connection with electrode plate 400. In one embodiment, the diameter of apertures 405 and 410 corresponds to the diameter of each conductive busbar to facilitate the physical and electrical connection between the conductive busbar and the interior surface of electrode plate 400 that defines the perimeter of each aperture 405/410. The inclusion of two apertures 405 and 410, each electrically connected to a conductive busbar, provides an additional conducting point for the electric current to flow into or out of electrode plate 400 (e.g., in comparison to a single aperture 101 electrically connected to a single conductive busbar). This additional conducting point decreases the distance the electric current flows across electrode plate 400.

Additionally, conductive busbars pass through a non-conductive grommet or other non-conductive lining within each of apertures 415 and 420. In one embodiment, the diameter of apertures 415 and 420 corresponds to the diameter of the conductive busbar combined with a minimum thickness of a non-conductive grommet to facilitate the conductive busbar passing through each aperture 415/420 without making an electrical connection.

Similar to electrode plate 100, perforations 425 are distributed across the surface of electrode plate 400. In one embodiment, perforations 425 are circular and have a diameter between 0.8 mm to 2 mm.

Margin 430 extends diagonally across electrode plate 400 between the corners that include apertures 405 and 410. The width of margin 430 is greater than or equal to the diameter of apertures 405 and 410. In one embodiment, margin 430 is 4-6 mm wider than the diameter of aperture 405/410. For example, if aperture 405/410 has a diameter of 6 mm, margin 430 is 10-12 mm wide. The location of apertures 405/410, in opposite corners of electrode plate 400, promotes an even current density distribution across electrode plate 400 by minimizing the distance the electric current flows between the portions of electrode plate 400 that make a physical and electrical connection with respective conductive busbars passing through apertures 405/410 and the other portions of electrode plate 400. The location of apertures 405/410 within margin 430 provides lower resistance paths (e.g., as compared to perforated portions of electrode plate 400), further promoting an even current density at the portions of electrode plate 400 that are furthest away from apertures 405/410.

In one embodiment, border margin 435 extends along the perimeter of electrode plate 400. Similar to margin 430, border margin 435 provides lower resistance paths to promote an even current density at the portions of electrode plate 400 that are furthest away from apertures 405 and 410. In one embodiment, border margin 435 is between 2-3 mm in width from each edge of electrode plate 400.

FIG. 5 is an exploded side view of electrode plate assembly 500 using electrode plates 400. Negative plates 505 are interleaved with positive plates 510. As illustrated, each negative plate 505 is adjacent to at least one positive plate 510. In one embodiment, there are an odd number of electrode plates 400, with one more negative plate 505 than the number of positive plates 510. For example, electrode plate assembly 500 includes seven electrode plates 400, including four negative plates 505 and three positive plates 510. More or less electrode plates 400 may be included. In one embodiment, nineteen positive plates 510 are interleaved between twenty negative plates 505.

Electrode plates 400 of opposite polarity are rotated front to back such that apertures 405 and 410 of a plate of a first polarity align with apertures 415 and 420, respectively, of a plate of a second polarity. For example, if FIG. 4 depicts a planar view of the front of electrode plate 400, negative plates 505 are electrode plates 400 that may be oriented with aperture 405 in the top left corner, aperture 415 in the top right corner, aperture 410 in the lower right corner and aperture 420 in the lower left corner. Positive plates 510 are electrode plates 400 oriented in reverse, with aperture 415 in the top left corner, aperture 405 in the top right corner, aperture 420 in the lower right corner and aperture 410 in the lower left corner.

Each electrode plate 400 includes a non-conducting grommet 530 and a hollow conductive sleeve 525, which are similar to grommet 204 and conductive sleeve 203 described above. First negative conductive busbar 515 passes through aperture 405 of each of the negative plates 505 and conductive sleeve 525, grommet 530, and aperture 415 of each of the positive plates 510. Second negative conductive busbar 520 passes through aperture 410 of each of the negative plates 505 and conductive sleeve 525, grommet 530, and aperture 420 of each of the positive plates 510. In one embodiment, conductive sleeves 525 are made of an electrically conductive material and are in electrical contact with a corresponding busbar 515/520 and electrode plates 400 of the same polarity. For example, negative conductive busbar 515 passes through the upper three conductive sleeves 525, making an electrical connection between negative conductive busbar 515 and each of the upper three conductive sleeves 525. The upper three conductive sleeves 525, being greater than or equal in width to the upper three grommets 530, are held in contact with a negative plate 505 on one or both sides of each respective conductive sleeve 525. As a result, the upper three conductive sleeves 525 increase the surface area of electrical connection between each negative plate 505 and negative conductive busbar 515. Additionally, conductive sleeves 525 make an electrical connection between negative plates 505. The lower three conductive sleeves 525 make similar electrical connections between second negative conductive busbar 520 and negative electrode plates 505.

Conductive washers 535 and conductive nuts 540 are secured to either end of conductive busbars 515 and 520. Conductive washers 535 and conductive nuts 540 secure negative conductive brace 545 to electrode plate assembly 500. Negative conductive brace 545 includes apertures (not shown) through which negative conductive busbars 515 and 520 pass and make an electrical connection with negative conductive brace 545. As a result, negative conductive brace 545 is both mechanically and electrically connected to negative conductive busbars 515 and 520.

FIG. 6 is another exploded side view of electrode plate assembly 500 using electrode plates 400. While FIG. 5 is described with reference to two apertures of each electrode plate 400, FIG. 6 is described with reference to the other two apertures. For example, FIG. 5 is described with reference to apertures 405 and 410 of negative plates 505 and apertures 415 and 420 of positive plates 510. In contrast, FIG. 6 is described with reference to apertures 415 and 420 of negative plates 505 and apertures 405 and 410 of positive plates 510.

Each electrode plate 400 includes a non-conducting grommet 630 and a hollow conductive sleeve 625, which are similar to grommet 204 and conductive sleeve 203 described above. First positive conductive busbar 605 passes through aperture 405 of each of the positive plates 510 and conductive sleeve 625, grommet 630, and aperture 415 of each of the negative plates 505. Second positive conductive busbar 610 passes through aperture 410 of each of the positive plates 510 and conductive sleeve 625, grommet 630, and aperture 420 of each of the negative plates 505. In one embodiment, conductive sleeves 625 are made of an electrically conductive material and are in electrical contact with a corresponding conductive busbar 605/610 and electrode plates 400 of the same polarity. For example, positive conductive busbar 605 passes through the upper four conductive sleeves 625, making an electrical connection between positive conductive busbar 605 and each of the upper four conductive sleeves 625. The upper four conductive sleeves 625, being greater than or equal in width to the upper four grommets 630, are held in contact with a positive plate 510 on one or both sides of each respective conductive sleeve 625. As a result, the upper four conductive sleeves 625 increase the surface area of electrical connection between each positive plate 510 and positive conductive busbar 605. Additionally, conductive sleeves 625 make an electrical connection between positive plates 510. The lower four conductive sleeves 625 make similar electrical connections between second positive conductive busbar 610 and positive electrode plates 510.

Conductive washers 635 and conductive nuts 640 are secured to either end of conductive busbars 605 and 610. Conductive washers 635 and conductive nuts 640 secure positive conductive brace 615 to electrode plate assembly 500. Positive conductive brace 615 includes apertures (not shown) through which positive conductive busbars 605 and 610 pass and make an electrical connection with positive conductive brace 615. As a result, positive conductive brace 615 is both mechanically and electrically connected to positive conductive busbars 605 and 610.

In one embodiment, conductive braces 545 and 615 are secured at opposite ends of electrode plate assembly 500.

Figure 7A:
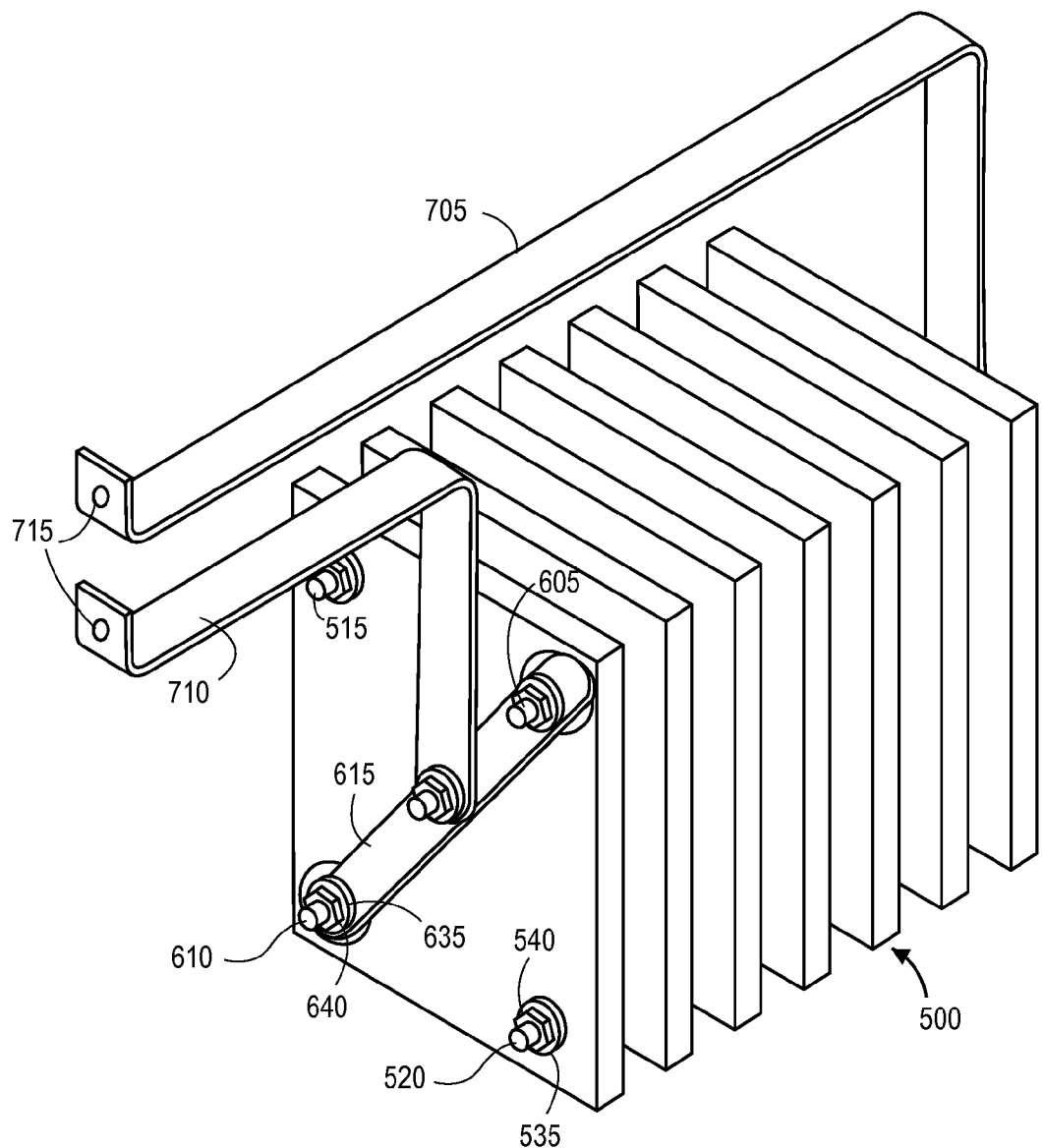
FIGS. 7A-B illustrate two perspective views of the assembled electrode plate assembly using electrode plates according to the second embodiment.
Figure 7B:
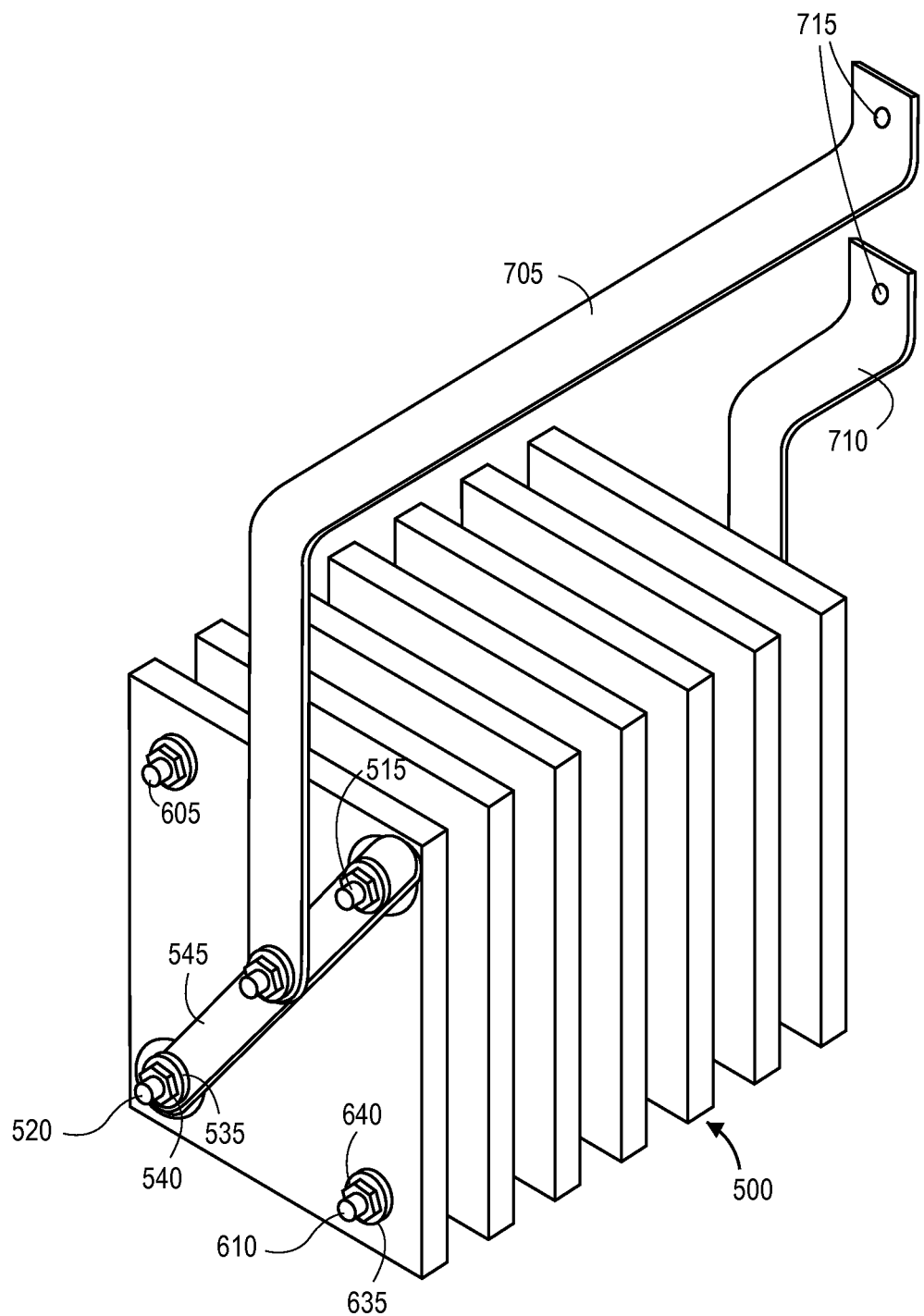

FIGS. 7A-B illustrate two perspective views of assembled electrode plate assembly 500 using electrode plates 400. Similar to FIG. 3, in an embodiment including conductive sleeves 525/625 of equal width to grommets 530/630, conductive sleeves 525/625 are placed within grommets 530/630 and therefore not visible when assembled. With conductive nuts 540/640 secured to either end of conductive busbars 515/520/605/610, electrode plates 400 are brought into close proximity with one another. Grommets 530/630 and/or conductive sleeves 525/625 maintain the spacing between electrode plates 400, e.g., keeping them approximately parallel to one another. In one embodiment, electrode plates 400 are spaced between 0.8 mm to 2 mm apart. With two additional conductive busbars and corresponding grommets 530/630 and/or conductive sleeves 525/625, electrode plate assembly 500 has more stability in maintaining the spacing between electrode plates than, e.g., electrode plate assembly 200.

Negative conductive bracket 705 is secured to, or otherwise an extension of, negative conductive brace 545. Similarly, positive conductive bracket 710 is secured to, or otherwise an extension of, positive conductive brace 615. Conductive brackets 705 and 710 fasten electrode assembly 500 to a wall of the electrolysis housing container (described below). For example, conductive brackets 705 and 710 each include an aperture 715 through which conductive bolts 312 and 313 pass and are mechanically secured.

Figure 8:
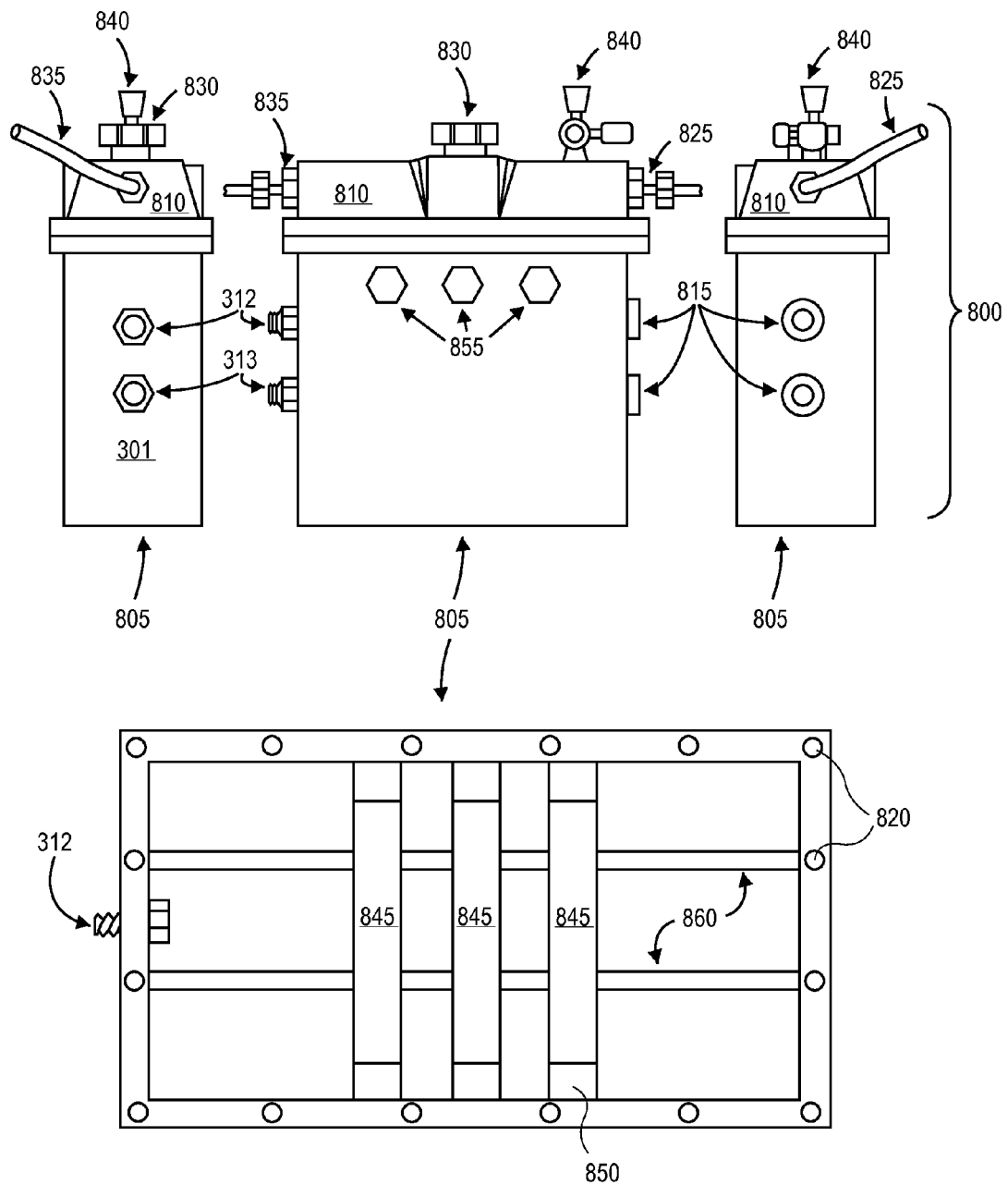
FIG. 8 illustrates various side views of an assembled electrolysis housing and a top view of the electrolysis housing container.

FIG. 8 illustrates various side views of an assembled electrolysis housing 800 and a top view of the electrolysis housing container 805. Electrolysis housing 800 includes electrolysis housing container 805 and electrolysis housing lid 810. Electrolysis housing container 805 holds an electrolyte solution into which electrode assembly 200/500 is at least partially submerged. In one embodiment, the electrolyte solution is 6% to 15% of sodium hydroxide by volume within distilled water or another pure water (e.g., including a water treated to reduce the size of the water molecules such as far infrared irradiated water). As used herein, pure water does not include mineral water or chlorinated tap water. In alternate embodiment, potassium hydroxide serves as the electrolyte rather than sodium hydroxide.

In one embodiment, a rubber gasket (not shown) and electrolysis housing lid 810 are placed on top of electrolysis housing container 805 such that the apertures (not shown) in the electrolysis housing lid 810, the corresponding apertures in the gasket, and corresponding apertures 820 in electrolysis housing container 805 are all aligned. Fasteners are inserted through the corresponding apertures in electrolysis housing lid 810 and gasket to secure electrolysis housing lid 810 and the gasket to electrolysis housing container 805.

As described with reference to FIG. 3, conductive bolts 312 and 313 serve as electrodes on an external portion of wall 301 or another portion of electrolysis housing container 805. In one embodiment, a wall of electrolysis housing container 805 includes one or more windows 815 to enable visual inspection of the level of electrolyte solution within the electrolysis housing container 805 once the electrolysis housing lid 810 is secured to electrolysis housing container 805. For example, one window 815 may be used to indicate a maximum level for the electrolyte solution and a second window 815 may be used to indicate a minimum level for the electrolyte solution. Alternatively, a single window 815 may be used with maximum and minimum level markings. In another embodiment, electrolysis housing container 805 is transparent, translucent, or includes a sensor to determine and indicate the level of electrolyte solution.

Electrolysis housing lid 810 includes gas outlet 825. During operation, generated hydrogen gas and oxygen gas rise to the surface of the electrolyte solution and into the air within the electrolysis housing 800. The gas mixture exits the electrolysis housing 800 through gas outlet 825 in electrolysis housing lid 810. For example, the tube of gas outlet 825 is inserted into the intake manifold of an engine. The operation/acceleration of the engine generates a partial vacuum that draws the gas mixture out of electrolysis housing 800 through gas outlet 825.

Electrolysis housing lid 810 further includes check valve 830. Check valve 830 is a spring loaded/one-way valve that allows air outside of electrolysis housing 800 to enter electrolysis housing 800 when a pressure difference between the outside and inside of electrolysis housing 800 reaches a threshold. For example, the partial vacuum described above may cause the pressure within electrolysis housing 800 to fall below the threshold difference with the pressure outside of electrolysis housing 800. In one embodiment, a tube extends from check valve 830 to the bottom of electrolysis housing container 805. For example, the tube may extend below electrode assembly 200/500 so that the rising air bubbles from check valve 830 help dislodge gas bubbles generated by electrode assembly 200/500, thereby increasing the efficiency of electrode assembly 200/500. In one embodiment, the tube terminates in a gas diffuser. For example, the gas diffuser may be made of porous metal, ceramic, or plastic (such as polyethylene) and have a pore diameter between 90 µm to 900 µm.

In one embodiment, electrolysis housing lid 810 includes gas inlet 835. Gas inlet 835 is optionally included when multiple electrolysis housings 800 are connected in series. The tube of gas inlet 835 is coupled to or otherwise enters a gas outlet of another electrolysis housing lid. In one embodiment, gas inlet 835 includes a tube that extends to the bottom of electrolysis housing container 805 or otherwise below the minimum level of the electrolyte solution. For example, the tube may extend below electrode assembly 200/500 so that the rising gas bubbles from gas inlet 835 further help dislodge gas bubbles generated by electrode assembly 200/500. The combined gas from both electrolysis housings 800 exit via gas outlet 825. In an embodiment in which electrolysis housing 800 is not connected in series, gas inlet 835 is omitted or plugged/clamped shut.

In one embodiment, electrolysis housing lid 810 includes electrolyte solution/water inlet valve 840. Water or electrolyte solution may be added to electrolysis housing container 805 via electrolyte solution inlet valve 840. In one embodiment, electrolyte solution inlet valve 840 includes a small funnel-shaped opening to facilitate filling.

Electrolysis housing container 805 includes support struts 845. Support struts 845 extend from one wall of electrolysis housing container 805 to an opposite wall. Support struts 845 help electrolysis housing 800 to maintain structural integrity when the partial vacuum described above is created within electrolysis housing 800. In one embodiment, support struts 845 are comprised of metal or another material of similar strength. Rubber covers 850 are placed on each end of support struts 845. In one embodiment, support struts are coupled to the walls of electrolysis housing container using nuts 855 fastened to support struts 845 on the outside electrolysis housing container 805. Support struts 845 and nuts 855 are made of corrosion-resistant metals or have a corrosion-resistant coating.

In one embodiment, one or more railings 860 are formed on the bottom interior surface of electrolysis housing container 805. Railings 860 are described further with reference to FIG. 9.

Figure 9:
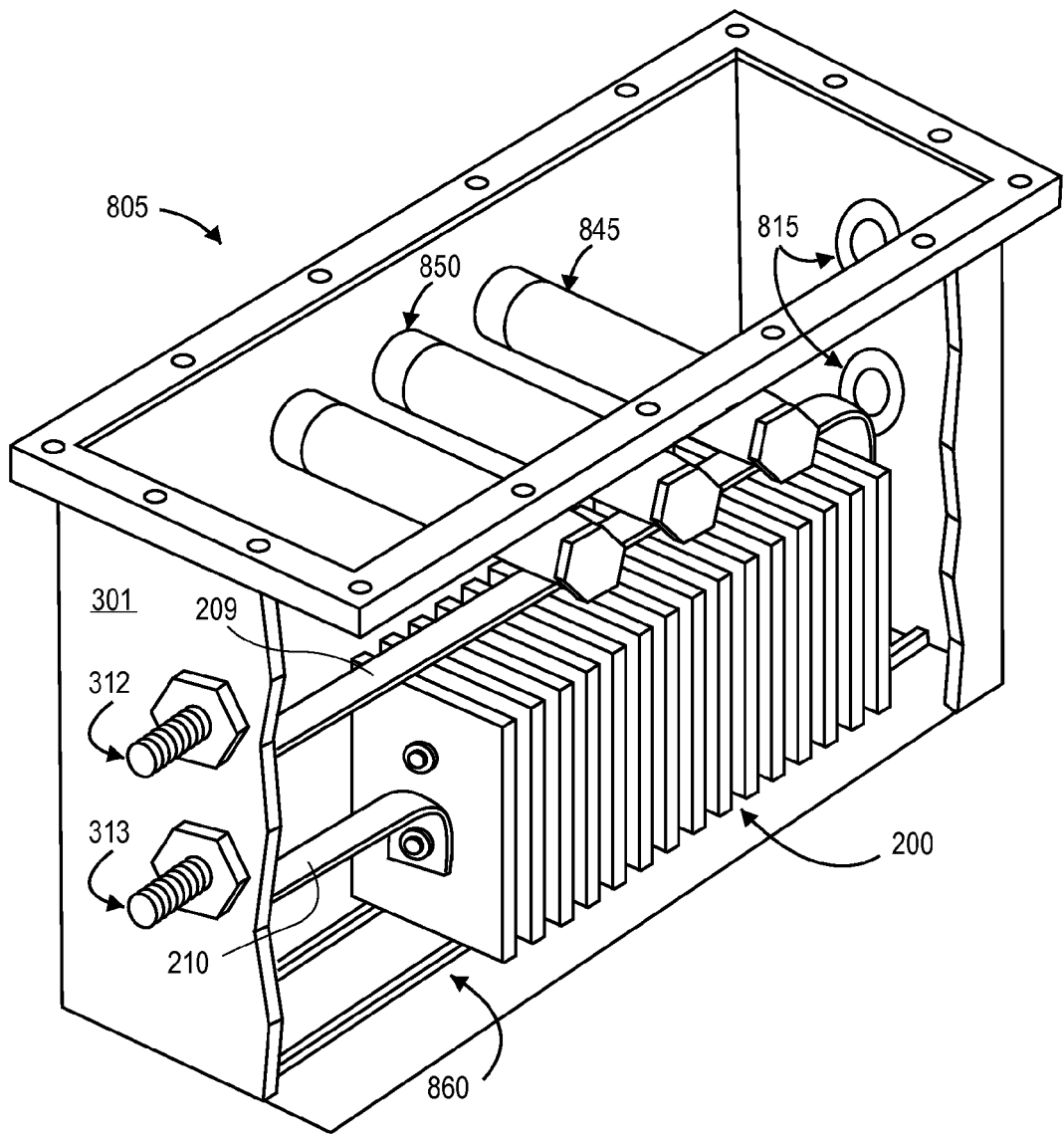
FIG. 9 illustrates a perspective cutaway view of the electrolysis housing container.

FIG. 9 illustrates a perspective cutaway view of the electrolysis housing container 805. Electrode assembly 200 is fastened to wall 301 via conductive brackets 209/210 and conductive bolts 312/313. In an alternate embodiment, electrode assembly 500 is fastened to wall 301 via conductive brackets 705/710 and conductive bolts 312/313.

Electrode assembly 200 rests upon railings 860. Railings 860 provide for space between the bottom interior surface of electrolysis housing container 805 and the bottom of electrode assembly 200/500. This space enables the electrolyte solution to flow below and expose more surface area of electrode plates 100/400 to the electrolyte solution (as compared to electrode assembly 200/500 sitting directly upon the bottom interior surface of electrolysis housing container 805). In one embodiment, railings 860 are grooved to help keep electrode assembly 200/500 in place while allowing for the electrolyte solution to move freely. Additionally, railings 860 enable a tube, e.g., from gas inlet 835, to extend below electrode assembly 200/500.

When electrolysis housing container 805 is filled with an electrolyte solution to a minimum level, e.g., as indicated by lower window 815, electrode plates 100 of electrode assembly 200 are completely submerged within the electrolyte solution.

During operation, electrode assembly 200/500 is connected to a DC power supply via conductive bolts/external electrodes 312/313. The DC power supply may be any device capable of producing direct current, e.g., a battery charger, a standard automotive battery, a photovoltaic cell that converts sunlight into direct current, etc. In theory, water at 30 degrees Celsius dissociates into hydrogen gas and oxygen when approximately 1.23 volts is applied to electrode plates 100/400. In one embodiment, a practical range at which disassociation occurs, and at which electrode plates 100/400 are operated, is 2 to 3 volts. The preferred amperage may be adjusted according to the amount of hydrogen gas and oxygen gas desired, with higher current producing higher amounts of gases. In one embodiment, the current is within a range of 20 to 40 amperes. Operating within the above-described ranges, excess voltage is not lost in heating the electrolyte solution, which is maintained below 45 degrees Celsius.

Figure 10:
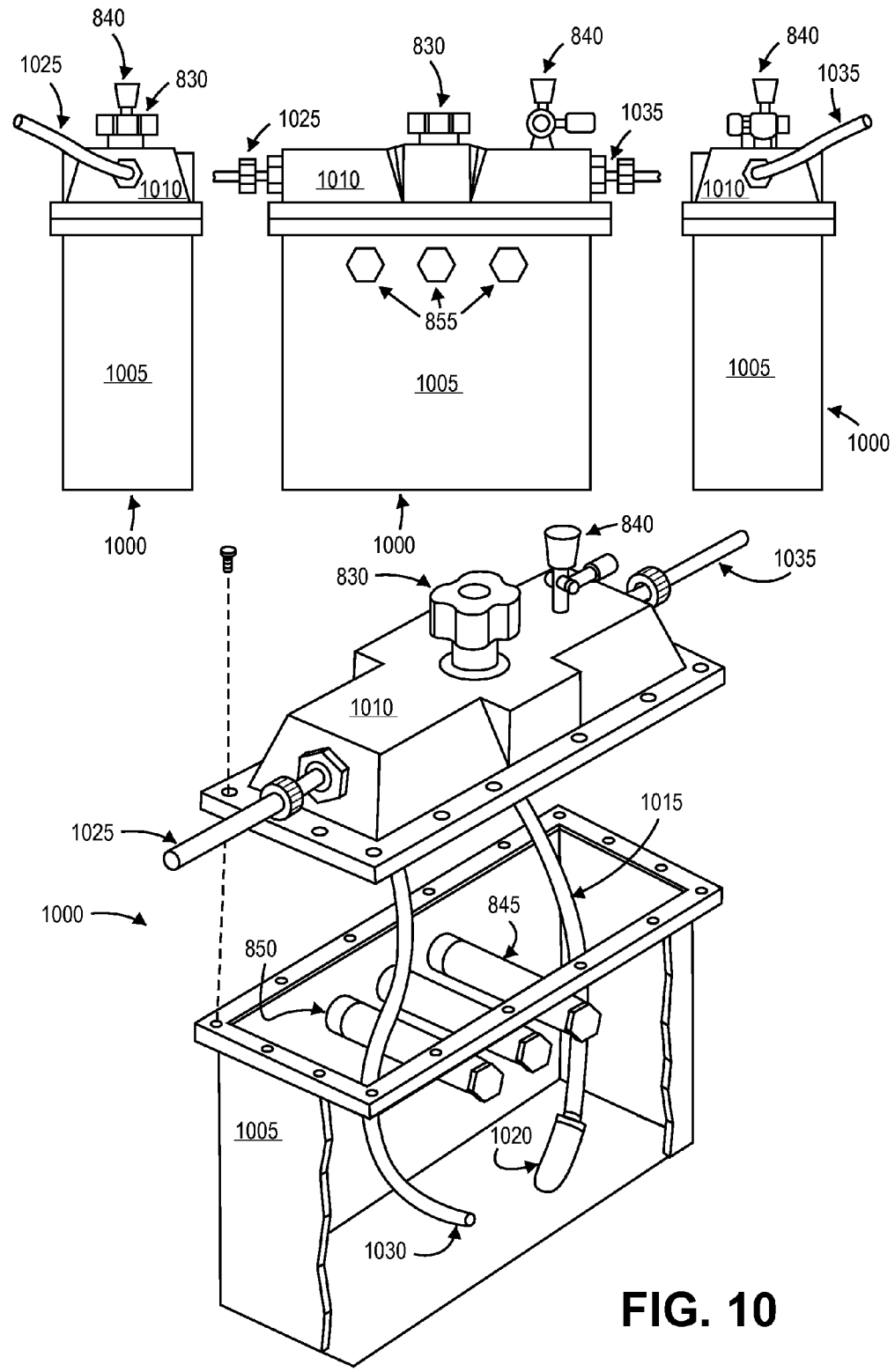
FIG. 10 illustrates various side views of a bubbler and a cutaway view of the bubbler container.

FIG. 10 illustrates various side views of bubbler 1000 and a cutaway perspective view of bubbler 1000. Rather than coupling electrolysis housing 800 directly to an engine manifold, bubbler 1000 is used in series between electrolysis housing 800 and the engine.

Bubbler 1000 includes bubbler container 1005 and bubbler lid 1010. Bubbler container 1005 holds distilled water or another pure water. Bubbler container 1005 is comprised of a substantially stiff plastic, such as polycarbonate. In one embodiment, bubbler container 1005 is made of a transparent or translucent plastic to enable a user to view the internal water level. Alternatively, bubbler container 1005 includes windows 815 (not shown in FIG. 10) or a sensor to provide an indication of water level.

Similar to electrolysis housing container 805, support struts 845 extend between opposing walls of bubbler container 1005 and include rubber caps 850. Support struts 845 help prevent deformation of bubbler container 1005 caused by internal pressure changes.

Bubbler lid 1010, like electrolysis housing lid 810, includes check valve 830 and water inlet valve 840. Check valve includes tube 1015 that extends to the bottom of bubbler container 1005. In one embodiment, tube 1015 terminates in gas diffuser 1020. For example, gas diffuser 1020 may be made of porous metal, ceramic, or plastic (such as polyethylene) and have a pore diameter between 90 μm to 900 μm. As outside air is forced through gas diffuser 1020, tiny bubbles rise to the surface of the water and increase the water vapor content of the air within bubbler 1000.

Bubbler lid 1010 further includes gas inlet 1025. The external tube of gas inlet 1025 is coupled to or otherwise enters gas outlet 825 in electrolysis housing lid 810. Gas inlet 1025 includes internal tube 1030 that extends to the bottom of bubbler container 1005 or otherwise below the water level. The generated mixture of hydrogen gas and oxygen gas from electrolysis housing 800 may include electrolyte vapor. As the gas mixture passes through the water in bubbler 800, the electrolyte vapor in the gas mixture is reduced.

Bubbler lid further includes gas outlet 1035. Gas outlet 1035 includes a tube that may be inserted into the intake manifold of the engine. An accelerating engine generates a partial vacuum that draws the gas mixture out of bubbler 1000. As described above, this partial vacuum activates check valve 830. The gas mixture of hydrogen gas, oxygen gas, and water vapor is drawn out of bubbler 1000 by the intake manifold and injected into the combustion chamber of the engine.

Bubbler 1000 also serves as a water reservoir for electrolysis housing 800. As the water is depleted in electrolysis housing 800, the pressure difference between electrolysis housing 800 and bubbler 1000 draws the distilled water out of bubbler 1000 and into the electrolysis housing 800, thereby replenishing the electrolyte solution. In an embodiment in which multiple electrolysis housings 800 are coupled in series, each electrolysis housing 800 draws water from the bubbler. The amount of water would be divided among the multiple electrolysis housings 800. Furthermore, if each electrolysis housing 800 includes check valve 830, the actual force of the partial vacuum or the pressure difference would depend on the pressure setting on the check valves 830. At a higher pressure setting, less outside air is drawn into electrolysis housing 800 through check valve 830 resulting in more suction force to draw water from bubbler 1000. The pressure setting for each check valve 830 may be adjusted individually for each electrolysis housing 800 to balance air intake with drawing water from bubbler 1000.

While illustrated as separate containers, in an alternate embodiment, electrolysis housing 800 and bubbler 1000 are combined into a single container. The single container is partitioned into two compartments that serve as electrolysis housing 800 and bubbler 1000, respectively.

Figure 11:
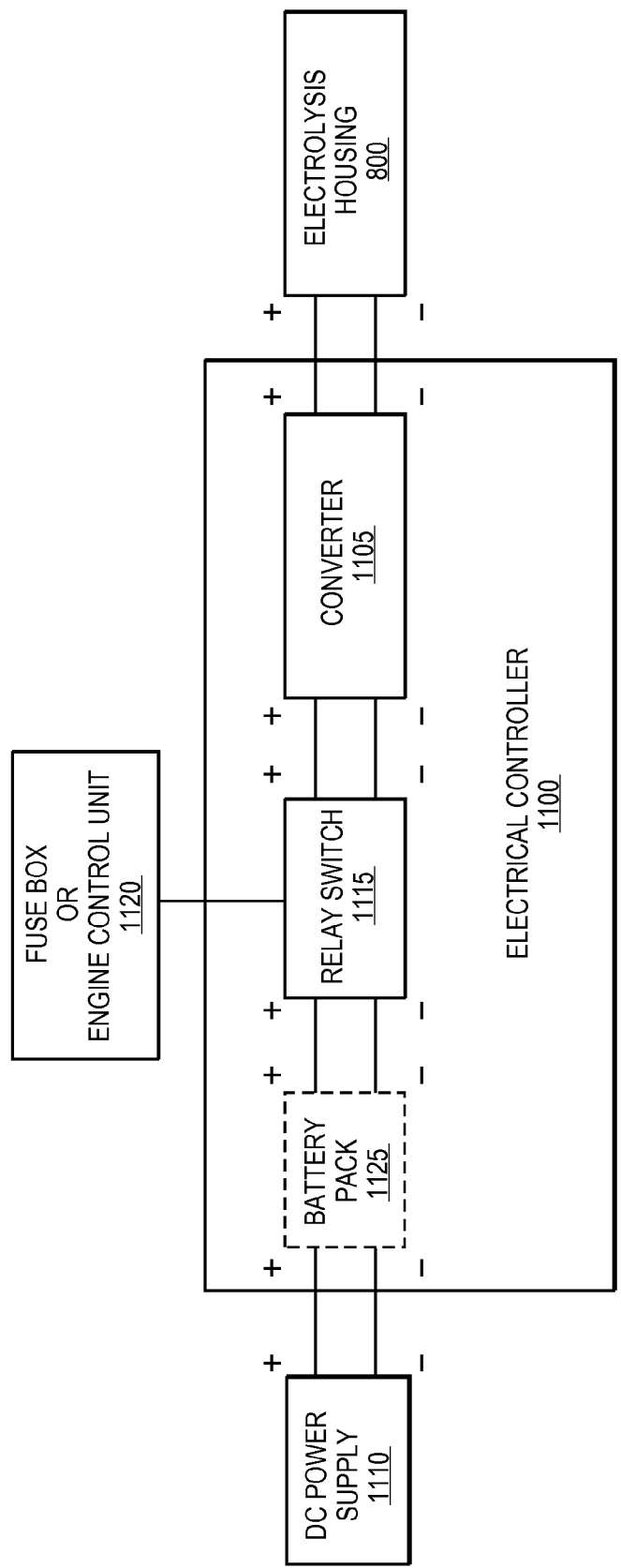
FIG. 11 illustrates, in block diagram form, an exemplary electrical controller.

FIG. 11 illustrates, in block diagram form, exemplary electrical controller 1100. In one embodiment, power supply 1110 is greater than 2 to 3 volts. For example, a car or truck commonly uses a 12 volt or 24 volt battery. Electrical controller 1100 includes converter 1105, such as a Buck Converter, to step-down the voltage to provide electrolysis housing 800 with 2 to 3 volts. In one embodiment, converter 1105 steps-up the direct current to provide electrolysis housing 800 with 20 to 40 amperes.

In one embodiment, electrical controller 1100 provides electrolysis housing 800 with power when electrical controller 1100 detects the corresponding engine is running and turns off the power to electrolysis housing 800 when electrical controller 1100 detects the corresponding engine is not running. For example, electrical controller 1100 includes relay switch 1115 coupled to fuse box or engine control unit 1120. When the engine is running, the connection to fuse box or engine control unit 1120 acts to close relay switch 1115, providing a path from power supply 1110 (and, if included, battery pack 1125) to converter 1105. When the engine is not running, the connection to fuse box or engine control unit 1120 acts to open relay switch 1115, blocking the path from power supply 1110 (and, if included, battery pack 1125) to converter 1105.

In one embodiment, electrical controller 1100 includes battery pack 1125 between power supply 1110 and relay switch 1115. The optional inclusion of battery pack 1125 is emphasized by the use of the dashed line border around the illustration of battery pack 1125. In one embodiment, battery pack 1125 includes one or more lithium iron phosphate rechargeable batteries. Alternatively, battery pack 1125 includes another type of rechargeable battery.

For example, battery pack 1125 may include 12 lithium iron phosphate rechargeable batteries, each rated at 3.3 volts and 1.2 ampere-hours (Ah). Four batteries are serially connected in each row and three rows are connected in parallel to create a battery pack that provides 13.2 volts and between 2.8 Ah-3.6 Ah.

Voltage fluctuations are not uncommon in a vehicle electrical system, especially when electronic accessories, air conditioning, or headlights are turned on. Additionally, in a vehicle electrical system designed around a 12 volt battery, the addition of electrolysis housing 800 and electrical controller 1100 may increase the wear on the battery. Battery pack 1125 ensures a stable input voltage to converter 1105 and, in turn, electrolysis housing 800. Additionally, battery pack 1125 reduces the wear on power supply 1110.

Figure 12:
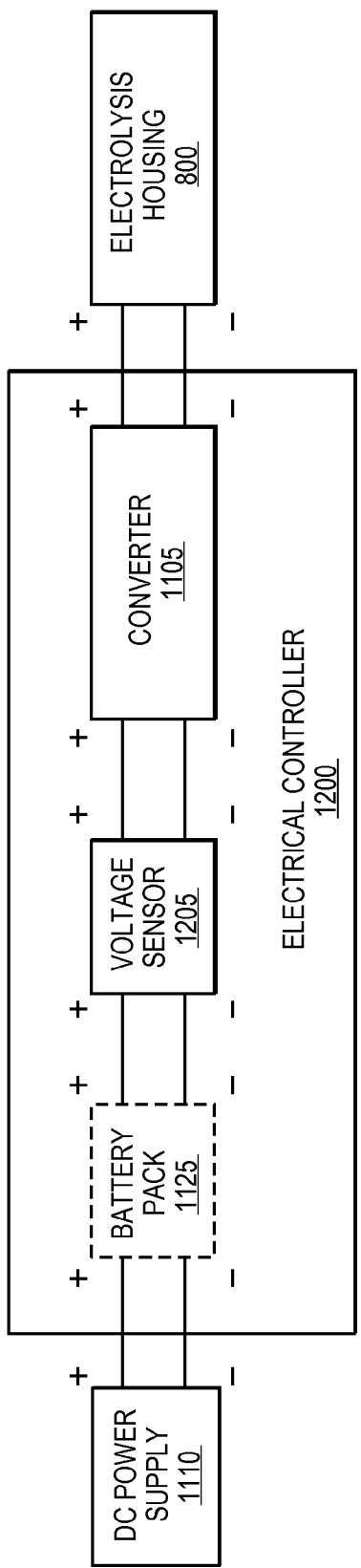
FIG. 12 illustrates, in block diagram form, another exemplary electrical controller.

FIG. 12 illustrates, in block diagram form, exemplary electrical controller 1200. Similar to the description above, electrical controller 1200 includes converter 1105 to provide stepped-down voltage/stepped-up current to electrolysis housing 800. Rather than relay switch 1115, however, electrical controller 1200 includes voltage sensor 1205 coupled in the path between power supply 1110 and converter 1105. Voltage sensor 1205 detects when a received voltage reaches a threshold. In response to the input voltage being greater than or equal to the threshold, voltage sensor 1205 closes the circuit between power supply 1110 and converter 1105. For example, when a car or truck engine is running, an alternator generates electricity to recharge the battery. The recharging of the battery results in a higher voltage when the engine is running than when the engine is not running. For example, a car with a 12 volt battery may have an alternator and battery operating at an output of 13 volts or greater when the engine is running. As a result, voltage sensor 1205 detects the threshold voltage of 13 volts, and connects power supply 1110 to converter 1105. In one embodiment, the threshold is 13.2 volts.

Similar to the description of electrical controller 1100 above, in one embodiment, electrical controller 1200 optionally includes battery pack 1125. While illustrated as separate electrical controllers 1100/1200, in one embodiment, a single electrical controller 1100/1200 includes both relay switch 1115 and voltage sensor 1205 to provide multiple modes of operation. In one embodiment, each electrolysis housing 800 is coupled to/includes its own electrical controller 1100/1200. Additionally, components of electrical controllers 1100/1200 may be separated into two or more separate controllers.

Examples described above refer to automotive applications of an electrolyzer. In another embodiment, the electrolyzer is used with a boiler that burns fossil fuels like coal, oil, or natural gas to heat water to generate steam for use in industrial processes, steam engines, and power generation, or to provide heat to chemical processes. The evolved hydrogen gas and oxygen gas is drawn out by a pump, which injects the gas mixture into the boiler. The injected gas mixture increases the efficiency of the boiler and reduces unwanted emissions by elevating the combustion temperature of the boiler and by achieving a more complete burn of the fossil fuels used.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims.

What is claimed is:

1. An electrolyzer comprising:
an electrode plate assembly including a plurality of electrode plates and a plurality of electrically conductive busbars, wherein
one or more of the plurality of electrode plates have perforations distributed across a surface of the electrode plate;
the plurality of electrode plates includes one or more positive electrode plates interleaved with one or more negative electrode plates;
each electrode plate has a first aperture and a second aperture, the second aperture being larger than the first aperture and lined with a non-conductive grommet;
the plurality of electrically conductive busbars includes a first positive conductive busbar and a first negative conductive busbar;
the first positive conductive busbar extends through the first aperture of each positive electrode plate and through the non-conductive grommet of the second aperture of each negative electrode plate, the first positive conductive busbar in electrical contact with each positive electrode plate and insulated from each negative electrode plate;
the first negative conductive busbar extends through the first aperture of each negative electrode plate and through the non-conductive grommet of the second aperture of each positive electrode plate, the first negative conductive busbar in electrical contact with each negative electrode plate and insulated from each positive electrode plate;
the one or more perforated electrode plates include a first margin without perforations;
the first margin has a width greater than or equal to a diameter of the second aperture;
the first margin extends lengthwise along a central axis of the perforated electrode plate; and
the first aperture and the second aperture are located within the first margin.

2. The electrolyzer of claim 1, wherein the one or more perforated electrode plates include a second margin without perforations, the second margin running along a perimeter of the perforated electrode plate and having a width greater than or equal to two millimeters.

3. The electrolyzer of claim 1, further comprising a second positive conductive busbar and a second negative conductive busbar, wherein
each electrode plate has a third aperture and a fourth aperture, the fourth aperture being larger than the third aperture and lined with a non-conductive grommet;
the second positive conductive busbar extends through the third aperture of each positive electrode plate and through the non-conductive grommet of the fourth aperture of each negative electrode plate, the second positive conductive busbar in electrical contact with each positive electrode plate and insulated from each negative electrode plate; and
the second negative conductive busbar extends through the third aperture of each negative electrode plate and through the non-conductive grommet of the fourth aperture of each positive electrode plate, the second negative conductive busbar in electrical contact with each negative electrode plate and insulated from each positive electrode plate.

4. The electrolyzer of claim 1, further comprising a plurality of electrically conductive sleeves, wherein:
each conductive sleeve is disposed within a grommet;
each conductive sleeve has an aperture through which one of the conductive busbars passes and makes an electrical connection with the conductive sleeve; and
each conductive sleeve creates an electrical connection between two negative electrode plates or between two positive electrode plates.

5. The electrolyzer of claim 1, further comprising a power converter to receive a power input and provide a power output to the electrode plate assembly, the power output at a lower voltage than the power input.

6. The electrolyzer of claim 5, wherein the power output is within the range of two to three volts and twenty to forty amperes.

7. The electrolyzer of claim 5, wherein the power input includes a 12 volt direct current battery and a rechargeable lithium ion battery pack.

8. The electrolyzer of claim 1, further comprising:
a housing including a housing container to hold an electrolyte solution, a housing lid coupled to the housing container, a first liquid inlet within the housing lid, a first gas outlet within the housing lid, a first check valve within the housing lid to allow air to flow into the housing container in response to reaching a threshold pressure within the housing, and a first support beam fastened to opposing internal walls of the housing container, wherein the electrode assembly is fastened to an internal wall of the housing container in a position to submerge the electrode assembly in the electrolyte solution.

9. The electrolyzer of claim 8, wherein the housing further comprises a gas inlet coupled to a gas outlet of another housing of another electrode plate assembly.

10. The electrolyzer of claim 8, wherein the first check valve is coupled to a first end of a first tube, a second end of the first tube coupled to a gas diffuser beneath the electrode plate assembly.

11. The electrolyzer of claim 8, further comprising:
a bubbler housing including a bubbler container to hold distilled water, a second support beam fastened to opposing internal walls of the bubbler container, a bubbler lid coupled to the bubbler container, a second liquid inlet within the bubbler lid, a second gas outlet within the bubbler lid, a gas inlet within the bubbler lid coupled to the first gas outlet within the housing lid, a second tube coupled to or passing through the gas inlet and having an end extended beneath a distilled water level within the bubbler container.

12. The electrolyzer of claim 11, further comprising:
a second check valve within the bubbler housing lid to allow air to flow into the bubbler container in response to reaching a threshold pressure within the bubbler housing, wherein the second check valve is coupled to a first end of a third tube, a second end of the third tube coupled to a gas diffuser beneath the distilled water level within the bubbler container.

13. The electrolyzer of claim 11, wherein the second gas outlet is coupled to an intake manifold of an engine, the electrolyzer further comprising a switch or controller to provide power output to the electrode plate assembly in response to a condition indicating that the engine is running.

14. The electrolyzer of claim 8, wherein:
the first positive conductive busbar is mechanically and electrically connected to a positive conductive bracket;
the first negative conductive busbar is mechanically and electrically connected to a negative conductive bracket;
the positive conductive bracket fastens the electrode assembly to the internal wall of the housing container and creates an electrical connection to a first electrode on an external portion of the housing; and the negative conductive bracket also fastens the electrode assembly to the internal wall of the housing container and creates an electrical connection to a second electrode on an external portion of the housing.

15. The electrolyzer of claim 14, further comprising a second positive conductive busbar and a second negative conductive busbar, wherein the second positive conductive busbar is mechanically and electrically connected to the positive conductive bracket, and wherein the second negative conductive busbar is mechanically and electrically connected to the negative conductive bracket.

16. The electrolyzer of claim 1, wherein the electrode plates or other conductive components are comprised of one or more of platinum, palladium, rhodium, titanium, nickel, or alloys or intermetallic mixtures of platinum, titanium, or steel.

17. The electrolyzer of claim 1, wherein the electrode plates or other conductive components have an electrochemically active coating.

18. The electrolyzer of claim 1, wherein the perforations are circular, each with diameter between 0.8 and 2 millimeters.

19. The electrolyzer of claim 1, wherein the electrode plate assembly is configured such that adjacent electrode plates are secured at a distance between 0.8 and 2 millimeters from one another.

20. The electrolyzer of claim 1, wherein one or more electrode plates have a thickness between 0.5 and 2 millimeters.

21. The electrolyzer of claim 1, further comprising an electrolyte solution comprising between 6% and 15% sodium hydroxide by volume.

22. The electrolyzer of claim 4, wherein each conductive sleeve further maintains a spacing between the two negative electrode plates or between the two positive electrode plates.

23. An electrolyzer comprising:
an electrode plate assembly including a plurality of electrode plates and a plurality of electrically conductive busbars, wherein
one or more of the plurality of electrode plates have perforations distributed across a surface of the electrode plate;
the plurality of electrode plates includes one or more positive electrode plates interleaved with one or more negative electrode plates;
each electrode plate has a first aperture and a second aperture, the second aperture being larger than the first aperture and lined with a non-conductive grommet;
the plurality of electrically conductive busbars includes a first positive conductive busbar and a first negative conductive busbar;
the first positive conductive busbar extends through the first aperture of each positive electrode plate and through the non-conductive grommet of the second aperture of each negative electrode plate, the first positive conductive busbar in electrical contact with each positive electrode plate and insulated from each negative electrode plate;
the first negative conductive busbar extends through the first aperture of each negative electrode plate and through the non-conductive grommet of the second aperture of each positive electrode plate, the first negative conductive busbar in electrical contact with each negative electrode plate and insulated from each positive electrode plate;
the one or more perforated electrode plates are substantially rectangular;
each electrode plate has a third aperture and a fourth aperture;
the first and third apertures are located in diagonally opposed corners of the perforated electrode plate;
the one or more perforated electrode plates include a first margin without perforations;
the first margin has a width greater than or equal to a diameter of the first aperture; and
the first margin extends diagonally from the first aperture to the third aperture.

24. The electrolyzer of claim 23, wherein the one or more perforated electrode plates include a second margin without perforations, the second margin running along a perimeter of the perforated electrode plate and having a width greater than or equal to two millimeters.

25. The electrolyzer of claim 23, further comprising a second positive conductive busbar and a second negative conductive busbar, wherein
the fourth aperture being larger than the third aperture and lined with a non-conductive grommet;
the second positive conductive busbar extends through the third aperture of each positive electrode plate and through the non-conductive grommet of the fourth aperture of each negative electrode plate, the second positive conductive busbar in electrical contact with each positive electrode plate and insulated from each negative electrode plate; and
the second negative conductive busbar extends through the third aperture of each negative electrode plate and through the non-conductive grommet of the fourth aperture of each positive electrode plate, the second negative conductive busbar in electrical contact with each negative electrode plate and insulated from each positive electrode plate.

26. The electrolyzer of claim 23, further comprising a plurality of electrically conductive sleeves, wherein:
each conductive sleeve is disposed within a grommet;
each conductive sleeve has an aperture through which one of the conductive busbars passes and makes an electrical connection with the conductive sleeve; and
each conductive sleeve creates an electrical connection between two negative electrode plates or between two positive electrode plates.

27. The electrolyzer of claim 26, wherein each conductive sleeve further maintains a spacing between the two negative electrode plates or between the two positive electrode plates.

28. The electrolyzer of claim 23, further comprising a power converter to receive a power input and provide a power output to the electrode plate assembly, the power output at a lower voltage than the power input.

29. The electrolyzer of claim 28, wherein the power output is within the range of two to three volts and twenty to forty amperes.

30. The electrolyzer of claim 28, wherein the power input includes a 12 volt direct current battery and a rechargeable lithium ion battery pack.

31. The electrolyzer of claim 23, further comprising:
a housing including a housing container to hold an electrolyte solution, a housing lid coupled to the housing container, a first liquid inlet within the housing lid, a first gas outlet within the housing lid, a first check valve within the housing lid to allow air to flow into the housing container in response to reaching a threshold pressure within the housing, and a first support beam fastened to opposing internal walls of the housing container, wherein the electrode assembly is fastened to an internal wall of the housing container in a position to submerge the electrode assembly in the electrolyte solution.

32. The electrolyzer of claim 31, wherein the housing further comprises a gas inlet coupled to a gas outlet of another housing of another electrode plate assembly.

33. The electrolyzer of claim 31, wherein the first check valve is coupled to a first end of a first tube, a second end of the first tube coupled to a gas diffuser beneath the electrode plate assembly.

34. The electrolyzer of claim 31, further comprising:
a bubbler housing including a bubbler container to hold distilled water, a second support beam fastened to opposing internal walls of the bubbler container, a bubbler lid coupled to the bubbler container, a second liquid inlet within the bubbler lid, a second gas outlet within the bubbler lid, a gas inlet within the bubbler lid coupled to the first gas outlet within the housing lid, a second tube coupled to or passing through the gas inlet and having an end extended beneath a distilled water level within the bubbler container.

35. The electrolyzer of claim 34, further comprising:
a second check valve within the bubbler housing lid to allow air to flow into the bubbler container in response to reaching a threshold pressure within the bubbler housing, wherein the second check valve is coupled to a first end of a third tube, a second end of the third tube coupled to a gas diffuser beneath the distilled water level within the bubbler container.

36. The electrolyzer of claim 34, wherein the second gas outlet is coupled to an intake manifold of an engine, the electrolyzer further comprising a switch or controller to provide power output to the electrode plate assembly in response to a condition indicating that the engine is running.

37. The electrolyzer of claim 31, wherein:
the first positive conductive busbar is mechanically and electrically connected to a positive conductive bracket;
the first negative conductive busbar is mechanically and electrically connected to a negative conductive bracket;
the positive conductive bracket fastens the electrode assembly to the internal wall of the housing container and creates an electrical connection to a first electrode on an external portion of the housing; and
the negative conductive bracket also fastens the electrode assembly to the internal wall of the housing container and creates an electrical connection to a second electrode on an external portion of the housing.

38. The electrolyzer of claim 37, further comprising a second positive conductive busbar and a second negative conductive busbar, wherein the second positive conductive busbar is mechanically and electrically connected to the positive conductive bracket, and wherein the second negative conductive busbar is mechanically and electrically connected to the negative conductive bracket.

39. The electrolyzer of claim 23, wherein the electrode plates or other conductive components are comprised of one or more of platinum, palladium, rhodium, titanium, nickel, or alloys or intermetallic mixtures of platinum, titanium, or steel.

40. The electrolyzer of claim 23, wherein the electrode plates or other conductive components have an electrochemically active coating.

41. The electrolyzer of claim 23, wherein the perforations are circular, each with diameter between 0.8 and 2 millimeters.

42. The electrolyzer of claim 23, wherein the electrode plate assembly is configured such that adjacent electrode plates are secured at a distance between 0.8 and 2 millimeters from one another.

43. The electrolyzer of claim 23, wherein one or more electrode plates have a thickness between 0.5 and 2 millimeters.

44. The electrolyzer of claim 23, further comprising an electrolyte solution comprising between 6% and 15% sodium hydroxide by volume.

* * * * *